J. W. KOHLHEPP.
CARCASS SCRAPING, POLISHING, AND CLEANING MECHANISM.
APPLICATION FILED JULY 17, 1907.
1,125,560.
Patented Jan. 19, 1915.
6 SHEETS—SHEET 6.
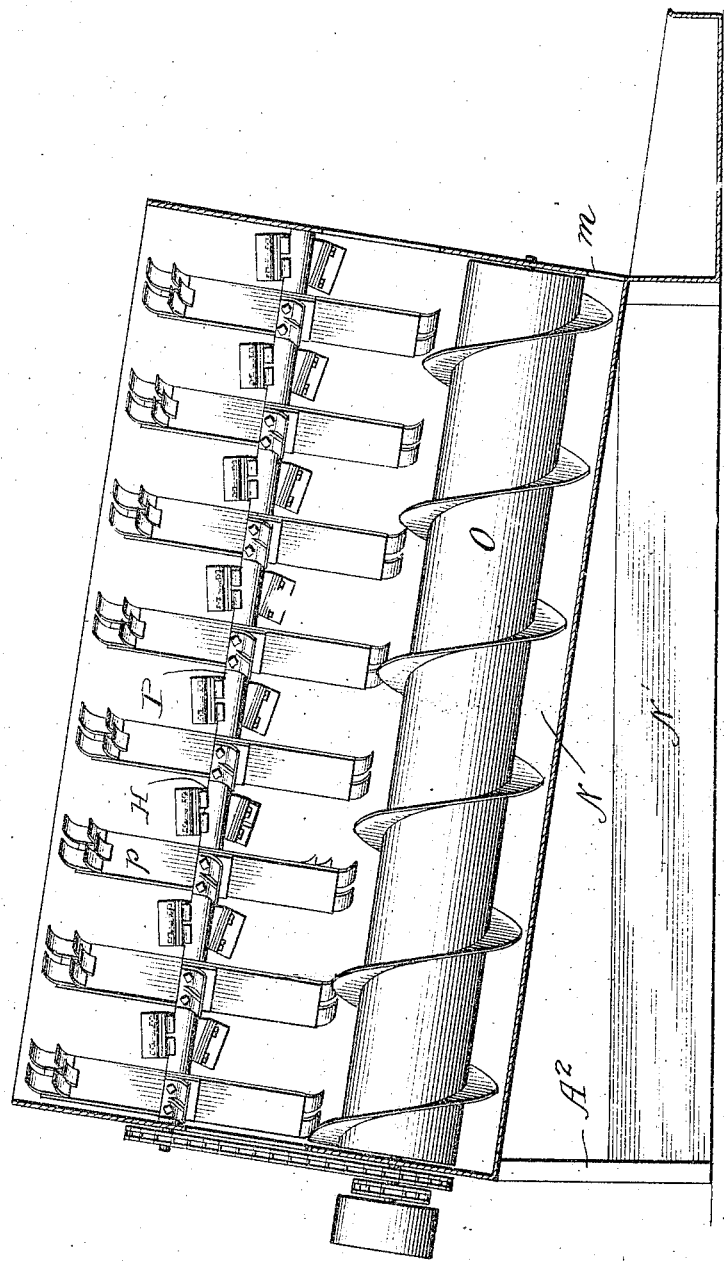

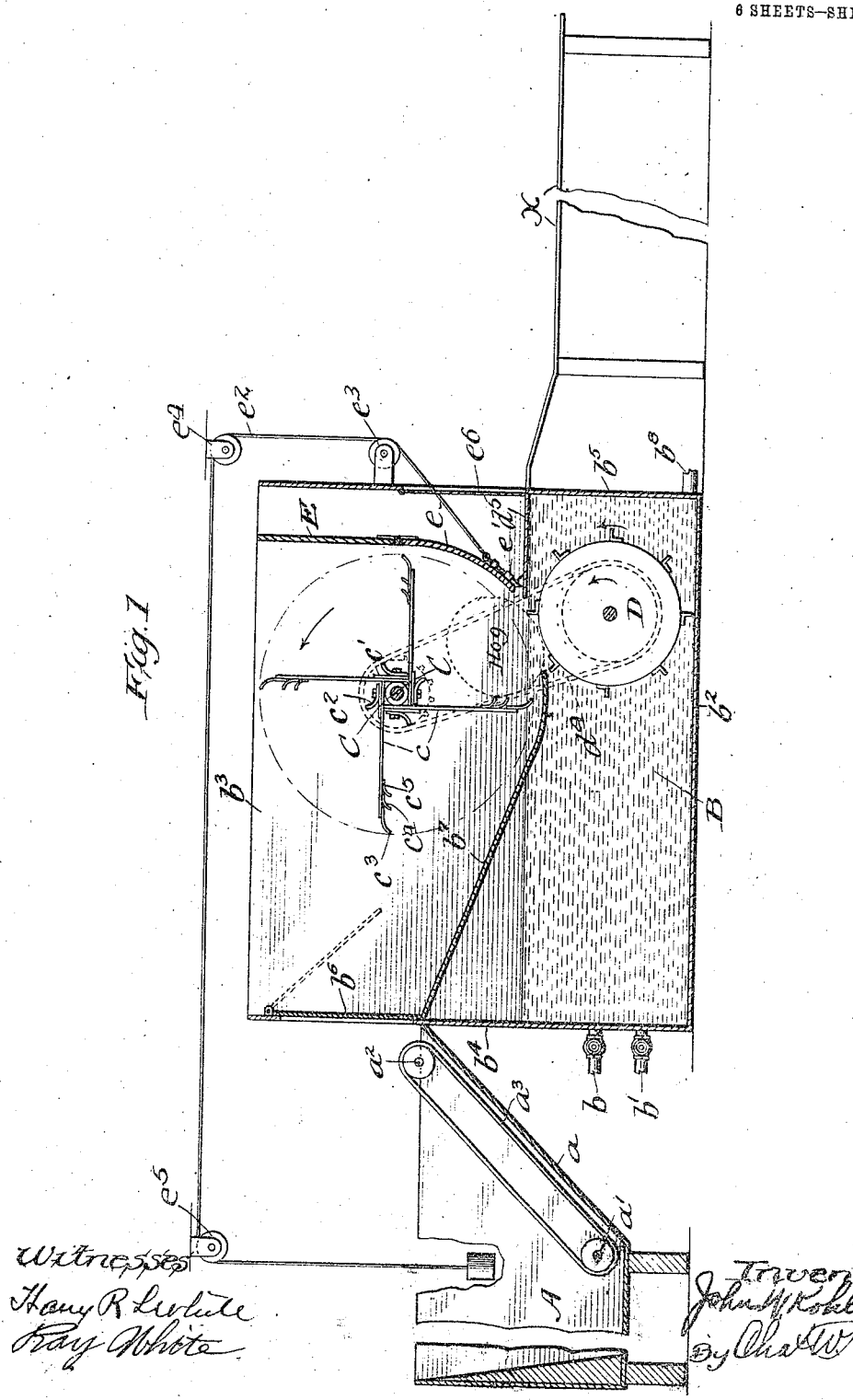

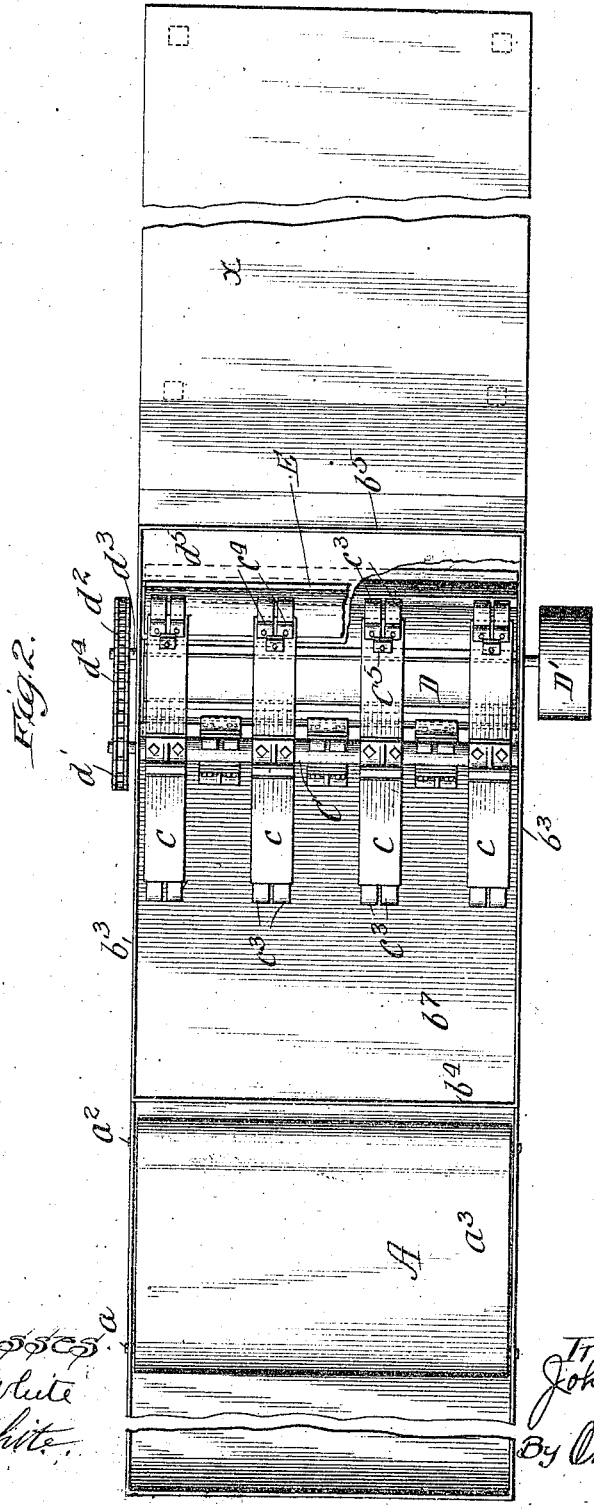

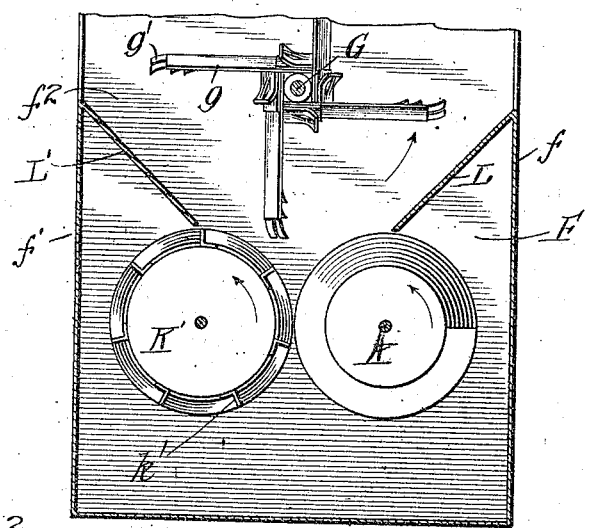
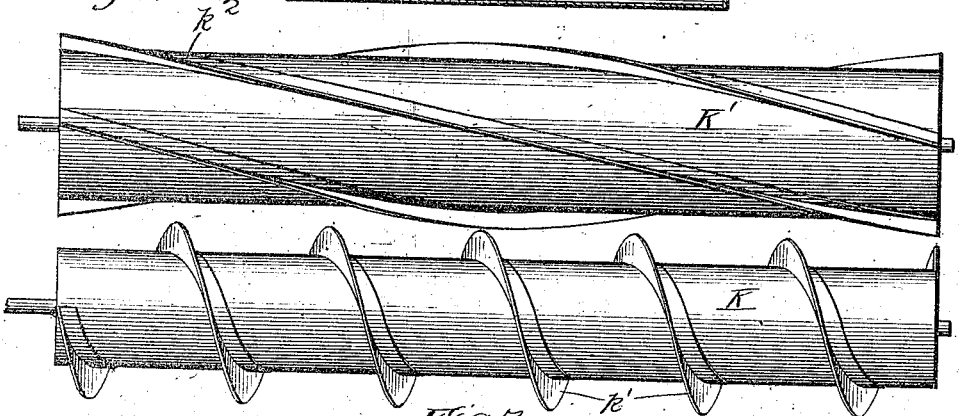
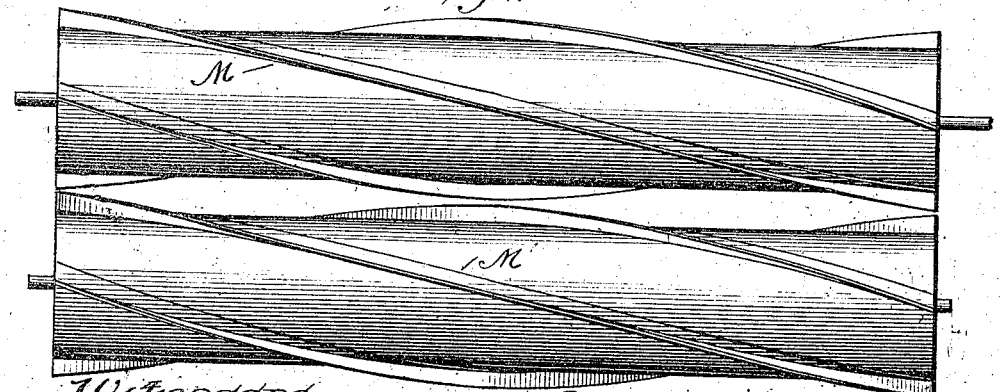

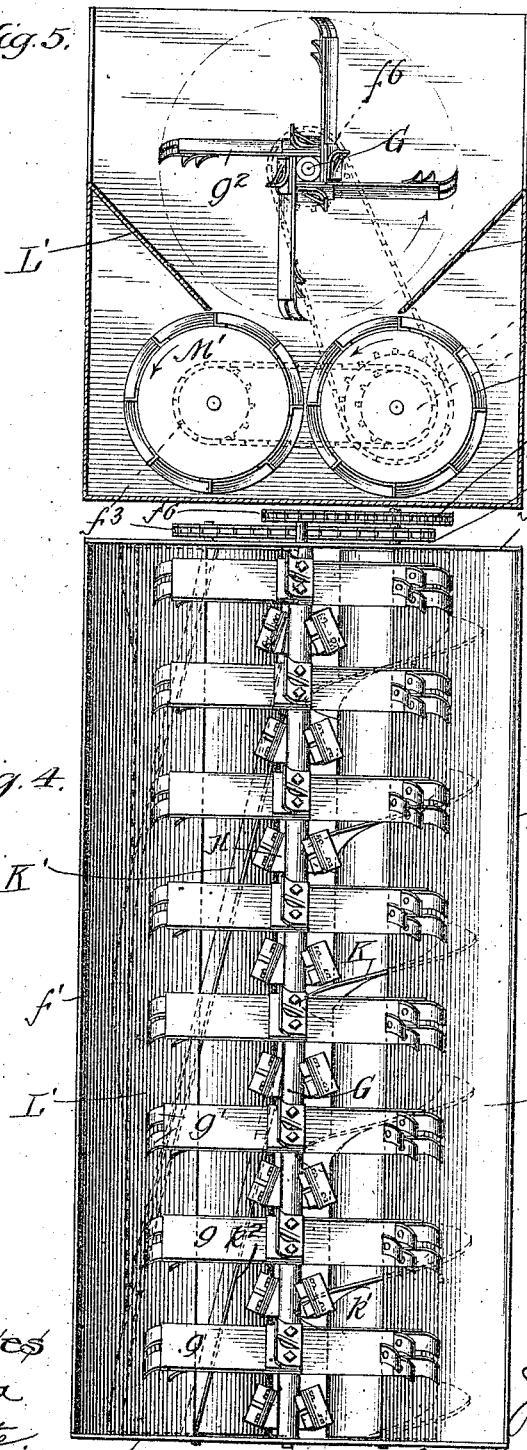

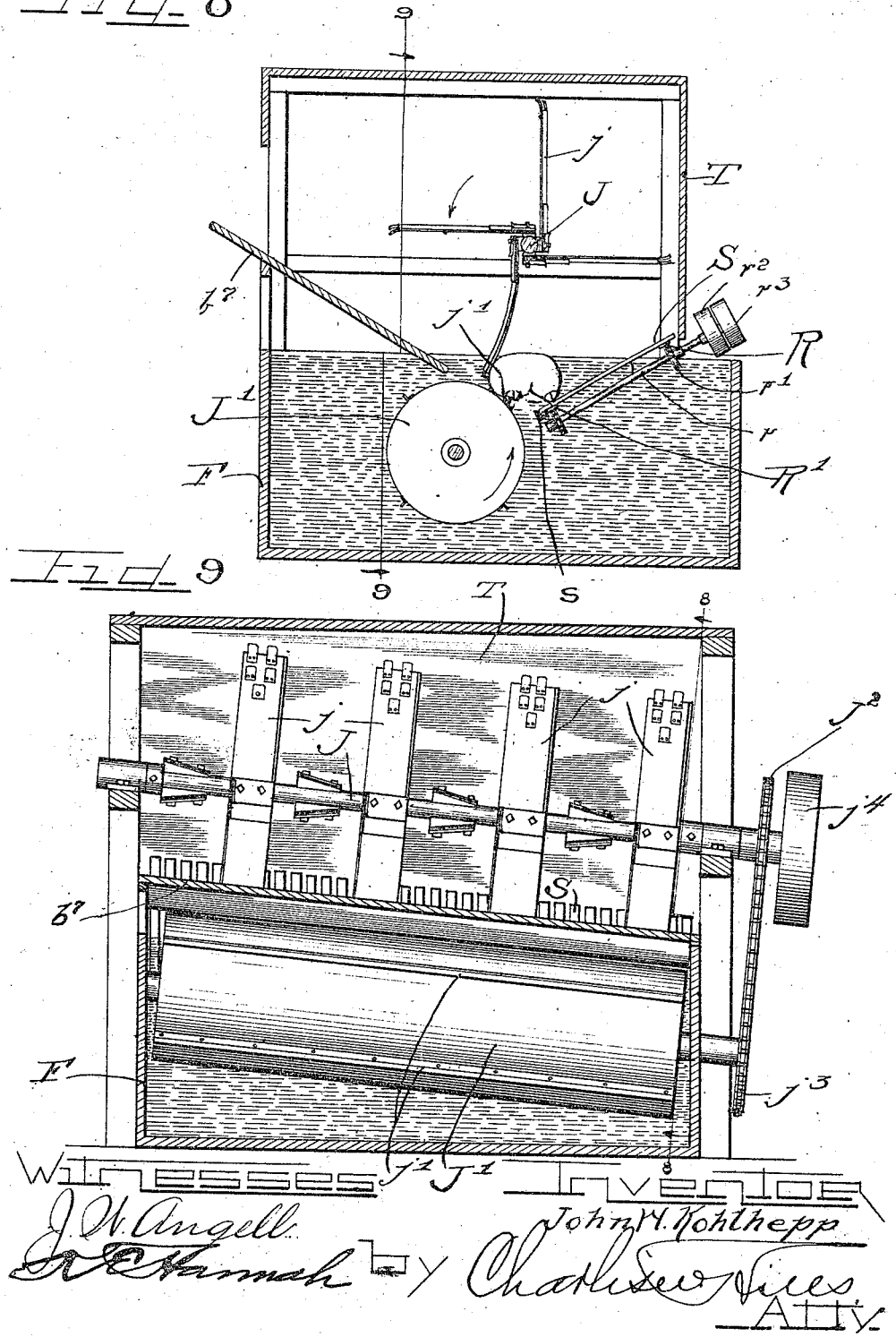

UNITED STATES PATENT OFFICE.

JOHN W. KOHLHEPP, OF CHICAGO, ILLINOIS, ASSIGNOR TO THE ALLBRIGHT-NELL COMPANY, A CORPORATION OF ILLINOIS.

CARCASS SCRAPING, POLISHING, AND CLEANING MECHANISM.

1,125,560. Specification of Letters Patent. Patented Jan. 19, 1915.

Application filed July 17, 1907. Serial No. 384,287.

*To all whom it may concern:*

Be it known that I, JOHN W. KOHLHEPP, a citizen of the United States, and a resident of Chicago, Cook county, Illinois, have invented certain new and useful Improvements in Carcass Scraping, Polishing, and Cleaning Mechanisms; and I do hereby declare that the following is a full, clear, and exact description of the same, reference being had to the accompanying drawings, and to the letters of reference marked thereon, which form a part of this specification.

This invention relates to improvements in scraping mechanisms and particularly to that class adapted for scraping, polishing and cleaning hogs.

It is an object of this invention to provide a carcass scraping machine in which the use of a conveyer necessitating the use of hooks and carriages is eliminated.

It is a further object of this invention to provide a machine in which the carcasses are moved past the scrapers at the desired rate or may remain in one place in the machine until completely cleaned and in which the carcasses are continuously rotated or turned thereby exposing all parts to the action of the scrapers and to provide a scraping device in which it is practically impossible to dislodge a carcass while being acted upon by the beaters.

It is a very important object of this invention to provide spiral rolls, drums or cylinders or plain rolls or drums with spiral rings, bars, bands, etc., secured thereto for supporting the carcasses, moving or conveying the same past the scrapers and simultaneously rotating or turning the carcasses.

It is a very important object of this invention to provide either a rigid spiral roll, drum or cylinder adapted for use when passing carcasses through the machine at certain velocities for instance slow travel and to provide rolls, cylinders or drums having flexible, resilient and yielding spiral strips or bars secured thereto which are adaptable for moving carcasses rapidly through the machine and may be set for any maximum rate of travel desired for the carcasses so that even though the velocity of the rolls should exceed the limit desired for most efficient scraping yet in which the resilient or flexible spirals will yield to prevent the carcasses from moving faster than the desired rate.

It is an exceedingly important object of this invention to provide a machine of the class specified in which a plurality of spiral rolls having the same or differently formed convolutions thereon are used conjointly for supporting, conveying and rotating the carcasses or in which a roll and conveyer are conjointly used for this purpose.

It is also an important object of this invention to provide a machine in which flexible scraping mechanisms are employed and in which the scraping mechanisms coact with the aforesaid conveying or moving and rotating mechanism for forcing the carcasses through the machine.

It is also an object of this invention to provide a device of the class specified in which the rotating and moving carcasses are partly submerged in fluid at a suitable temperature whereby the hair, dirt and refuse are washed off as loosened and in which the carcasses are polished and scraped simultaneously.

It is a further object of this invention to provide a device in which the carcasses are, if necessary, further scalded while being acted upon by the scrapers should they not have been properly scalded in the scalding vat or tank but entirely eliminating the use of spraying and pumping devices.

It is also an object of this invention to provide a device in which the carcasses are delivered by gravity to the moving and rotating mechanism and a gravity exit therefor after scraping.

It is a further object of this invention to provide a highly efficient and greatly simplified machine of both small and great capacity and the capacity depending upon the arrangement of the rollers and scrapers.

It is finally an object of this invention to provide a durable machine in which delicate mechanisms and parts are entirely avoided and which requires minimum number of attendants.

The invention consists of the matters hereinafter described and more fully pointed out and defined in the appended claims.

On the drawings: Figure 1 is a longitudinal vertical section of a device embodying my invention with the scraping mechanisms arranged transversely the travel of the carcass. Fig. 2 is a top plan view thereof. Fig. 3 is a transverse vertical section of a device embodying my invention in which the beaters, rotating and moving mechanisms are arranged longitudinally of the machine. Fig. 4 is a top plan view with the guards removed. Fig. 5 is a section similar to Fig. 3 with the beaters arranged differently. Fig. 6 illustrates the moving and rotating rolls or drums employed in Figs. 3 and 4. Fig. 7 illustrates the moving and rotating rolls or drums employed in Fig. 5. Fig. 8 is an end view of a device embodying my invention in which a roll or drum and conveyer are conjointly used. Fig. 9 is a side elevation thereof. Fig. 10 is a modified form of a device embodying my invention having the mechanisms inclined. Fig. 11 is a detail of the wedge blocks.

As shown in the drawings: A indicates a scalding vat or tank constructed of any suitable material and size and having the rear bottom wall $a$ thereof inclined upwardly and rearwardly. Journaled in the sides of the tank at the upper and lower ends of said inclined wall $a$ are shafts $a'—a^2$ on which the elevator $a^3$ is supported. Adjacent the rear end of said scalding tank A is a water tank B provided with suitable water inlet $b$ and steam or heating fluid inlet $b'$ and with a suitable wash out pipe or plug $b^8$. Said tank B is constructed of sheet metal or any other preferred material and comprises a bottom wall $b^2$, side walls $b^3$ and end walls $b^4—b^5$ of a height, width and length to contain the various mechanisms therein.

The wall $b^4$ of the tank B is placed against the top of the inclined wall $a$ of the scalding vat and is provided with a swinging or automatically closing door $b^6$ above the top of the inclined wall of the scalding tank which is of a length to admit the hog lengthwise therethrough from the conveyer $a^3$. Rigidly secured to the side walls $b^3$ and end wall $b^4$ of said tank is an inclined platform $b^7$ which extends rearwardly from the bottom of the door opening and the lower end thereof is directed horizontally or at a slight angle upwardly.

Journaled in the side walls $b^3$ of said tank B is a beater shaft C on which are bolted or otherwise rigidly secured flexible beater arms $c$ constructed of any suitable material such as canvas, chains, rubber or other flexible medium.

A flat plate $c'$ of suitable length is secured at the lower end of the beater arms and a curved plate $c^2$ is secured thereagainst by means of rivets or in any other suitable manner which strengthens the lower end of the arms and prevents short bending. Rigidly secured to the outer ends of said beater arms $c$ are a plurality of sets of flexible or rigid blades $c^3—c^4—c^5$ having their outer ends curved outwardly and as shown arranged two abreast but obviously any number may be used in a set.

Journaled in suitable bearings in the side walls $b^3$ below and at the rear of the beater shaft C is a roll, drum or cylinder D to which are rigidly secured in any preferred manner bars or plates $d$ of suitable metal or other material which are shown as angle irons secured to the roller by one flange and the other flange is directed radially outwardly and parallel the axis of the drum.

A suitable driving pulley D' is secured to the drum shaft $d^3$ at one end and sprocket wheels $d'—d^2$ are rigidly secured to the beater shaft C and drum shaft $d^3$ of the drum D outside and at the opposite side of the tank and a chain $d^4$ is trained therearound which drives the beaters.

Above and slightly to the rear of the center of the roll or drum D just sufficiently for the bars $d$ to pass is a platform $d^5$ which is shown as horizontal to the end wall $b^5$ of the tank and is then inclined downwardly to deliver the scraped and cleaned carcasses by gravity upon the operating table or bench X.

A partition E is secured to the side walls $b^3$ of the tank B above the platform $d^5$ and pivoted thereto is a door $e$ curved toward the opposite end of the tank and provided with a spring latch $e'$ normally locking the door in closed position. A cable or cord $e^2$ trained around suitable pulleys $e^3—e^4—e^5$ is secured to the latch $e'$ and extends within convenient reach of an attendant for opening the door to admit the cleaned carcass through the opening in the end wall $b^5$ upon the platform X and if desired a suitable strip of flexible material $e^6$ such as canvas or swinging doors may close said exit.

In the constructions illustrated in Figs. 3 to 7 inclusive the machines are arranged for large capacity and the scalding vat and delivery platform may be the same as shown in Figs. 1 and 2 or any other form and preferably automatically closing doors are employed similar to those before described or suitable curtains or aprons as $e^6$.

Supported on suitable uprights or posts $A^2$ is a water tank F having suitable side and end walls $f—f'—f^2$ and which is provided with steam, water and clean out pipes and valves as before described.

Journaled in suitable bearings in the end walls $f^2$ of the tank at the proper height is a beater shaft G extending longitudinally of the tank to which are rigidly secured flexible beater arms $g$ provided with scrapers $g'$ such as before described. Said beater arms $g$ as shown clearly in Figs. 3 and 4 are inclined outwardly at a suitable angle longitudinally with the shaft toward the delivery end of the machine by means of wedge blocks H. Said wedge blocks as shown in Fig. 11 are provided with a straight edge $h$ which is concaved to conform to the convex surface of the shaft and the opposite side $h'$ is inclined at an angle depending upon the desired angularity of the beaters. The wedges are secured on the shaft between the beater arms having their apexes directed as shown toward the entrance to the machine and bolts rigidly secure the wedges and beaters in oppositely disposed pairs on the shaft as shown clearly in Fig. 4.

Journaled in the end walls $f^2$ of the tank below the beater shaft G are spiral rolls, drums or cylinders K—K' each having gudgeons or shafts in the ends thereof which extend through suitable water tight journal boxes beyond the ends of the tank. Said rolls or cylinders K—K' as shown in Fig. 6 are constructed of metal, wood, canvas or other suitable material. The roll or drum K is provided with a bar, strap or band $k'$ of metal or other suitable material coiled spirally around the roll in the form of a helix and which extends from end to end of the roll. The roll or drum K' is provided with a bar, strap or plate $k^2$ of metal or other suitable material and is shown as an angle iron which extends longitudinally of the roll or drum and is curved partly therearound forming a spiral roll or drum.

The bands, straps, bars, or coils are constructed in two forms namely, rigid spirals or bars which are made of material such as steel or other non-yielding material and resilient and flexible spirals or bands constructed of spring steel, rubber or other suitable material, the object of which will be hereinafter described.

It is to be distinctly understood that in any construction shown any form of roll or drum may be used and either flexible or rigid bars or ribs may be used with any form of drum. The specific construction used depends entirely upon the specific demands of the user—e. g., for a large slaughter house a metal cylinder may be used with steel ribs which are slightly flexible to yield should the machine operate above a given velocity of a yielding cylinder may be used such as a solid canvas or rubber cylinder and either yielding or non-yielding ribs. On the other hand, in smaller plants, where one hog is operated on at a time either a metal or other cylinder may be used with either yielding or non-yielding ribs and the construction for any user may vary to meet the exigencies of the specific case. The preferable form of yielding ribs is constructed of spring steel, although other material may be used as is obvious and is shaped as an ordinary angle iron. The preferable form of non-yielding rib used is also of angle iron shape.

Any suitable driving mechanism may be employed but as shown in Fig. 4 and dotted lines in Fig. 5 sprocket wheels $f^3$—$f^4$—$f^5$—$f^6$ are secured on the ends of the drum or roll shafts and beater shaft respectively and actuate the drums or rolls K and K' in the same direction and the beaters oppositely therefrom as shown by the arrows in Figs. 3 and 5.

Guards L—L' are secured on each side of the tank and incline downwardly to a point approximately over the center of the rolls and allow the spirals to nicely clear the same.

The beater arms $g^2$ shown in Fig. 5 are not arranged angularly with the shaft and instead of employing different spiral rolls or drums both rollers M—M' are similar to the spiral roll or drum K' before described.

The construction illustrated in Figs. 8 and 9 is similar to that already described except a conveyer and drum act conjointly instead of two drums or rolls.

The tank F is similar to those already described and journaled therein is the beater shaft J provided with beaters $j$ as before described.

Journaled in the tank below and to the left of the beaters is the roll or drum J' provided with bars or blades $j'$ which for small capacity machines extend parallel with the axis and for large capacity machines are spiral in form as before described.

Tracks R—R' on different horizontal planes are rigidly engaged in the tank and incline slightly upwardly to the delivery end of the machine.

Inclined shafts $r$ are journaled at each end of the machine having suitable sprocket wheels $r'$ thereon which actuates the inclined conveyer S which may be of any suitable type but conveniently is a flight or lag conveyer and a guard T of any suitable kind returns the hog to the drum should the beaters force the same up the conveyer.

A guard bar or rail $s$ shown as an angle iron is rigidly secured by one flange to the track or other suitable place and bears against the lower side of the conveyer and prevents the same from running or slipping off the tracks.

Sprocket wheels $j^2$—$j^3$ are secured to the beater shaft and drum shaft and a pulley $j^4$ is secured on the end of the drum shaft for connection with a suitable source of power.

Secured on one of the conveyer shafts is a loose pulley $r^2$ adapted for connection with any source of power or the drum or the beater shaft and a rigid pulley $r^3$ is keyed on the shaft which operates the conveyer to remove the carcass from the machine.

An elevator similar to $a^3$ heretofore described delivers the carcasses from the vat or scalding tank onto an inclined platform $b^7$ such as before described and delivers the carcasses by gravity upon the drum and conveyer.

In the construction illustrated in Fig. 10 the tank N is inclined toward the delivery end and is provided with a suitable outlet $m$ at the lower end thereof adapted to deliver the refuse and hair therethrough into a receptacle from which it is delivered to any suitable place and a water supply tank N' is situated beneath the tank by means of which water is supplied to clean the carcass by any suitable means.

The spiral rollers O are inclined longitudinally of the tank as is also the scraper shaft D and the beater arms B are arranged thereon as before described with reference to Fig. 3.

The drive is similar to that before described.

The operation is as follows: The construction illustrated in Figs. 1 and 2 is for a small capacity machine. The hogs after being suitably scalded in the vat or tank A are moved upon the elevator $a^3$ which delivers them through the door $b^6$ and the carcasses move by gravity to the end of the platform $b^7$ and upon the roller D. Inasmuch as the bars $d$ are parallel with the axis of the roller upon rotation thereof the bars at each revolution engage the hog and rotate or turn the same continuously. The hog is not moved longitudinally inasmuch as the roll or drum is not spiral and the scrapers which rotate oppositely from the direction of rotation of the drum whip and scrape the hair and refuse from the carcass as the same is being rotated. The beaters prevent the carcass from being thrown rearwardly from the rotating drum and the rigid door $e$ prevents the carcass from being moved by the beaters forwardly beyond the roll so that at all times the carcass is continuously turning in position for the beaters to act continuously on all parts thereof. The water level in the tank may be any preferred height but is shown as slightly above the roller D approximately on a level with the middle of the carcass so that the carcass is lying and rotating in water which is heated or not as is found necessary and the beaters acting thereon not only scrape the bristles therefrom but polish the carcass. After the carcass is thoroughly cleaned the cord $e^2$ is pulled releasing the catch and opening the door and the carcass is forced upon the platform $d^5$ and is delivered by gravity upon the operating table or bench X. The cord is released and the operation repeated.

The construction shown in Figs. 3 to 7 inclusive is a larger capacity machine and rollers and beater shafts extend longitudinally of the machine. A plurality of spiral rolls or drums of the same kind may be employed or of course one of each construction may be employed acting conjointly. The operation of the spiral rollers shown in Figs. 3, 4 and 6 are as follows: The roller K' rotates as shown by the arrow to the left and the bars or spirals $k^2$ striking the carcass constantly rotate or turn the same inwardly upon the roller K, said roller K rotating in the same direction the helical spiral forces the carcass endwise therealong at a rate dependent upon the number of revolutions per minute made and the roll or drum K' also aids in moving the carcass therealong. At the same time the carcasses are being turned and passed through the tank the beaters $g^2$ are acting thereon on all parts of the carcass and inasmuch as the beater arms are of flexible material the same conform to the carcass and a large surface of the hog is scraped by each sweep of the sets of blades. Owing to the angularity of the beaters the same strikes the carcass and force it toward the delivery end of the machine thus pulling the carcasses along aiding the rolls and drums. The guards L—L' prevent all possibility of the carcasses from being dislodged although danger from this source is slight. As before described the water level in the tank is maintained at the desired height to wash and clean the carcass.

It may be desired according to various circumstances and the mode of drive to use either the rigid spiral rollers or those having flexible spirals thereon and the operation in either case is the same except where flexible and resilient spirals are used they may be constructed for a maximum speed at which to pass the carcass through the tank and when the revolutions of the rollers exceeds a certain velocity from carelessness or other causes the spirals yield and the carcasses thus cannot be forced through the machine at a greater rate than desired. The advantages of this are obvious for in handling the carcasses in large quantities the machine is operated at full speed and should the drive become too rapid the carcasses nevertheless are passed through the machine at a rate for efficient scraping. Where two spiral rolls of similar construction are used as shown in Fig. 5 the operation is similar and both rolls coact in forcing the carcasses therealong as before described.

The construction shown in Figs. 8 and 9 may be for either small capacity or large depending upon the length of the machine. For small capacity machines the beater shafts are slightly longer than the longest hog. The carcasses are delivered to the drum J' and rest thereon and on the conveyer. The drum rotates the hog as before described and the belt engages on the loose pulley of the conveyer shaft and thus the conveyer is not actuated. As the beaters act oppositely from the rotation of the roller the hog cannot be dislodged rearwardly and the conveyer by its inclination prevents the carcass from being moved away from the beaters but should this happen the guard T returns the same to be acted upon by the beaters. After the carcass has been cleaned the belt is shifted to the fixed pulley thereby actuating the conveyer and moving the carcass out of the machine. For large capacity machines the conveyer is continuously actuated and the carcasses passed through the machine successively and continuously. The conveyer also inclines upwardly toward the exit end of the machine so that the carcasses may be rotated in water and also be delivered over the edge of the vat upon a suitable table.

If preferred the operating mechanisms may be inclined as shown in Fig. 10 thus utilizing gravity and the tank may or may not be inclined.

It is seen that the use of spraying devices and pumps is eliminated and that the carcasses are washed clean as they are rotated continuously in water. Furthermore should the carcasses not be sufficiently scalded for removal of the bristle the carcass may again be scalded in the tank as the scrapers act thereon.

Many changes of construction may be varied without departing from the principles of this invention and I therefor do not desire to limit this application for patent as to details or otherwise than necessitated by the prior art.

I claim as my invention:

1. In a machine of the class specified a roll or drum adapted to support a carcass, means movable longitudinally of said roll for conveying the carcass longitudinally of the roll and beaters acting upon the carcass as it is conveyed.

2. In a scraping machine a roll or cylinder, longitudinally movable mechanism adapted to move carcasses longitudinally of the roll, and coacting beaters acting centrifugally and by impact on the rotating carcasses to scrape the same.

3. In a scraping, polishing and cleaning mechanism, flexible beaters acting downwardly to clean carcasses, a drum or roll acting simultaneously to turn the carcasses and inclined means coacting with the roll for supporting the carcasses.

4. In a machine of the class described flexible scraping mechanisms acting downwardly upon the carcasses and longitudinally and transversely movable means for supporting and rotating said carcasses while being acted upon by the scrapers.

5. In a machine of the class described coacting beaters, a roll acting conjointly therewith to turn and scrape carcasses, and an inclined conveyer adapted to convey the carcasses through the machine longitudinally of said roll and maintain the same in a position to be acted upon by said beaters and roll as aforesaid.

6. In a device of the class described the combination with flexible beaters and means supporting partly submerged carcasses and turning the same continuously while acted upon by the beaters.

7. In a device of the class described means for conveying, supporting and turning a partly submerged carcass and beaters acting on the carcass while partly submerged.

8. In a device of the class described the combination with linearly movable means of rotatable coacting mechanisms and means adapted to drive the linearly movable means and rotatable mechanisms to support, advance and dehair the carcass.

9. In a device of the class described a roll or cylinder for aiding in supporting and rotating carcasses, a lag conveyer for aiding the cylinder in supporting the carcasses and adapted to convey the carcasses and flexible scraping mechanism acting on the carcass simultaneously as the same is rotated and conveyed.

10. In a machine for the purposes specified a linearly movable inclined conveyer and a longitudinal roll or drum acting conjointly therewith to convey and rotate carcasses.

11. In a machine for the purposes specified, the combination of a conveyer, a longitudinal roll acting conjointly therewith to completely support, convey and rotate carcasses, a beater shaft above the roll and conveyer and flexible beaters thereon acting by impact to whip the bristles and hair from the carcasses.

12. In a device of the class described a roll, rigid bars or ribs secured to the roll, adapted to turn a carcass, a belt conveyer adapted to move a carcass longitudinally of the roll and scraping mechanisms supported above the moving carcass for scraping the same.

13. In a device of the class described the combination with a roll or drum having ribs on its circumference, conveying means adjacent threreto adapted together with said roll to support and convey carcasses and means acting on the carcasses to remove the hair, bristles and refuse therefrom.

14. In a device of the class described the combination with means for simultaneously rotating a carcass transversely, and conveying the same longitudinally of flexible beaters acting to remove the bristles and dirt from the carcasses.

15. In a machine of the class described the combination with means for simultaneously rotating, conveying and supporting carcasses of scraping mechanism positioned thereabove acting conjointly with the aforesaid means to force the carcasses through the machine.

16. In a machine of the class described a roll or drum, bars or strips rigidly secured thereon and adapted to rotate a partly submerged carcass and a conveyer adapted to convey the rotating carcass longitudinally of the roll.

17. In a machine of the class described a roll or drum, bars or strips rigidly secured thereon and adapted to turn a carcass, an inclined conveyer adapted to advance a partly submerged carcass and beaters adapted to strike said carcass angularly in the direction of their travel.

18. In a machine of the class described means adapted to rotate a carcass, a conveyer adjacent thereto adapted to move the carcass through the machine, beater shafts and beaters secured thereto and inclined toward the delivery end of the machine.

19. In a carcass scraping, polishing and cleaning mechanism a conveyer for advancing a carcass, means for continuously turning the carcass, said conveyer and turning means coacting to support the carcass, a guard preventing the carcass from leaving the conveyer and mechanism acting to beat and scrape the carcass while turning and advancing.

20. In a machine for the purposes specified a coacting roll and conveyer adapted to support a carcass, rigid bars or strips secured to the roll for rotating the carcasses and beaters acting by impact on the carcasses to remove the bristles and dirt therefrom.

21. In a machine for the purposes specified coacting revoluble devices adapted to completely support a carcass, rigid bars or strips secured to one of said devices for rotating and moving the carcasses, beaters acting by impact on the carcasses to remove the bristles and dirt therefrom and means above the revoluble devices for preventing dislodgment of a carcass.

22. In a machine of the class described coacting mechanisms, one moving longitudinally with respect to the other and yielding and resilient bars or bands secured to one of said mechanisms, and said mechanisms adapted to rotate and move a carcass longitudinally of the machine.

23. In a machine of the class specified the combination of coacting mechanisms, yielding, resilient bars or ribs secured to one of said mechanisms and coacting with the other mechanism to rotate and move a carcass endwise, and beaters acting on the carcasses to dehair and advance the same along the coacting mechanisms.

24. In a device of the class described the combination with scraping mechanism, of a roll adapted to rotate carcasses beneath the scraping mechanism, a linearly movable conveyer adapted to act conjointly with said roll to assist in conveying rotating carcasses through the machine and longitudinally of the roll and thereby expose all parts of the carcasses so rotated and conveyed to the action of the scraping mechanism.

25. In a device of the class described the combination with a roll, means secured thereto spaced suitable distances apart around the periphery of the roll adapted each to partially turn a carcass and flexible scraping mechanism acting transversely of the carcasses as rotated.

26. In a device of the class described the combination with a roll of projections thereon adapted to engage and turn a carcass, guards preventing dislodging of the carcass and beaters acting upon the carcass as rotated.

27. In a device of the class described a tank, parallel mechanisms therein adapted to continuously rotate and to advance carcasses, a shaft journaled above said mechanisms, flexible and resilient scraping and beating mechanism thereon and means adapted to deliver the carcasses to the parallel mechanisms by gravity.

28. In a device of the class described a tank, parallel mechanisms journaled therein, one to continuously rotate and the other to advance carcasses, a shaft journaled in the tank, flexible and resilient scraping and beating mechanism thereon and means adapted to deliver the carcasses to the mechanisms by gravity.

29. In a device of the class described a water tank, coacting mechanisms therein adapted to support a partly submerged carcass and rotate and advance the same while partly submerged and scraping mechanisms acting on the parts of the carcass that are not covered by water.

30. In a device of the class described a water tank, coacting mechanisms adapted to support a partly submerged carcass and rotate and advance the same while partly submerged, scraping mechanisms acting on the carcass to scrape and polish the same and means for delivering the carcasses to the mechanisms by gravity of the carcass.

31. In a device of the class described a water tank, coacting mechanism adapted to support a partly submerged carcass and rotate the same while partly submerged, scraping mechanisms acting on the submerged carcass and acting centrifugally to scrape and polish the carcass, means for delivering the carcasses to the mechanisms by gravity of the carcass and part of said mechanism adapted to conduct the carcasses from the tank.

32. In a device of the class described a water tank, means in said tank below the normal water level for supporting, advancing and rotating partly submerged carcasses, scraping mechanisms in the tank above the water level therein adapted to remove the bristles and refuse from the carcasses.

33. In a device of the class described a water tank, means in said tank below the normal water level for supporting, advancing and rotating partly submerged carcasses, scraping mechanisms in the tank adapted to remove the bristles and refuse from the carcasses, an inclined platform on which the carcasses are delivered to the scraping mechanism.

34. In a device of the class described a tank, beater shafts secured therein, flexible beater arms secured in oppositely disposed pairs on said shaft, wedge blocks between the shaft and beater arms, scraping mechanisms on said beater arms and means below the beater for conveying and rotating carcasses past the scrapers.

35. In a device of the class described the combination with a shaft of beater arms adapted to be secured thereto, means for securing the beater arms angularly with the shaft, scraper blades rigidly secured on the beaters and means conveying and rotating a submerged carcass as acted upon by the beaters.

36. Scraping mechanism for a machine of the class specified embracing a shaft, wedges having concaved sides to fit the shaft, arranged in oppositely disposed pairs, with their apexes directed in the same direction, beater arms secured to the shaft bearing against the wedges and scraping means on the beaters.

37. In a carcass scraping and polishing device scraping mechanism and a rotatable roller and linearly movable conveyer adapted to act conjointly to support, rotate and convey a carcass through the machine longitudinally of the roller.

38. In a device of the class described the combination with centrifugally acting scraping mechanism of means for supporting and rotating carcasses partly covered with water and an inclined conveyer adjacent said means for moving the carcass endwise.

39. In a machine of the class described, a conveyer inclined sidewise and inclined upwardly adapted to move a carcass out of the machine, a roll or drum adjacent thereto, means secured to the roll or drum for rotating or turning the carcass and beaters adapted to sweep transversely of the carcasses to remove the bristles and refuse therefrom.

40. In a machine for the purposes specified a roll or drum and a conveyer acting conjointly therewith to support a carcass, said drum adapted to rotate the carcass, and the conveyer adapted to move the carcass through the machine longitudinally of the drum.

41. In a machine of the class set forth a drum having bars or ribs rigidly engaged thereto adapted to rotate a carcass and a conveyer inclined longitudinally and transversely acting conjointly with the drum to support a carcass and adapted to convey the carcass from the machine.

42. In a machine of the class set forth a drum having bars or ribs rigidly engaged thereto, adapted to rotate a carcass, a conveyer inclined longitudinally and transversely of the machine and acting conjointly with the drum to support a carcass and adapted to convey the carcass from the machine and a guard above the conveyer.

43. In a machine of the class set forth a drum having bars or ribs rigidly engaged thereto, adapted to rotate a carcass, a longitudinally and transversely inclined conveyer acting conjointly with the drum to support a carcass and adapted to convey the carcass from the machine, a guard above the conveyer and hair and bristle removing mechanism acting on the carcass as rotated.

44. In a device of the class described the combination with means for constantly turning a partly submerged carcass exposing all parts above the water, of scraping mechanisms acting on all the parts and a constantly moving conveying mechanism.

45. In a device of the class described means for constantly turning a partly submerged carcass exposing all parts above the water, scraping mechanism acting on the parts as exposed and a conveyer acting to remove the carcass from the machine without the use of hooks.

46. In a device of the class described a conveyer, means acting conjointly therewith to support a partly submerged carcass, and means acting on the parts of the carcass that are not submerged to remove the bristles, hair and refuse therefrom.

47. In a device of the class described a tank partly filled with water, means in the tank below the water level for rotating a carcass lying thereon and a conveyer in the tank having one edge below the water level and inclining above the water level adapted to move the carcass from the water out of the tank.

48. In a device of the class described a tank partly filled with water, means in the tank below the water level for rotating a carcass lying thereon, a conveyer in the tank having one edge below the water level and inclining above the water level adapted to move the carcass from the water out of the tank and scraping mechanisms in the tank acting on the carcass.

49. In a machine of the class described means for rotating a carcass, means for advancing said carcass endwise, said carcass being free of any grappling to the advancing means and scraping means for acting transversely on the endwise moving carcass.

50. A scraping machine comprising a traveling platform, in combination with traveling scrapers moving transversely to the direction of movement of said platform so as to act progressively on bodies carried by said platform.

51. A scraping machine comprising a vertically movable scraper, in combination with a carrying mechanism comprising a bed, shafts journaled on said bed, sprocket wheels revolved by said last named shafts, sprocket chains carried by said last named wheels, a floor carried by said last named chains, and means whereby said scraping and carrying mechanisms are connected and operated together.

52. In a device of the class described a partially submerged conveyer, a rotatable drum to support the carcasses, resilient scraping means thereon, and flexible scraping means mounted above and acting downwardly on the carcass.

53. In a device of the class described rotatable supporting and scraping means for the carcasses, rotatable yieldable members above the same adapted to co-act therewith to rotate and dehair the carcass and said beaters acting to spray the carcass during the operation.

54. In a device of the class described a partially submerged conveyer, a supporting roller, resilient scraping means thereon, and rotatable flexible scraping means mounted above said roller and adapted to co-act therewith to dehair the carcass.

55. In a device of the class described rotatable supporting, conveying and scraping means for the carcass, an inclined approach to admit the carcasses thereto, and yieldable rotating members mounted above said means to co-act therewith in conveying and scraping the carcass.

56. In a hog scraping apparatus the combination of a rotary scraping device, a support for a carcass transversely inclined relatively to its direction of movement, means for moving said support in a fixed path and in a linear direction to hold the carcass within the line of action of the scraping device, and means for actuating said scraping device.

57. Scraping mechanism for a machine of the class specified embracing a roll, scraping ribs thereon, a shaft, wedges having concaved sides to fit the shaft arranged in oppositely disposed pairs with their apexes directed in the same direction, beater arms secured to the shaft bearing against the wedges, and scraping means on the beaters.

58. In a machine of the class described a roll or drum, bars or strips rigidly secured thereon and adapted to rotate a partly submerged carcass and beaters adapted to strike the carcass to dehair and assist in the rotation of the same.

59. In a hog dehairing machine a longitudinally movable conveyer an axially rotatable element parallel thereto for advancing the carcass and scraping devices rotatable with the said element and about the same axis and projecting radially outward therefrom.

60. The combination of an inclined conveying element movable in a horizontal line, of means assisting the same to support a carcass, and scraping mechanisms mounted to dehair a carcass on said conveying element and means.

61. In a device of the class described a tank, beater shafts secured therein, flexible beater arms secured in oppositely disposed pairs on said shaft, wedge blocks between the shaft and beater arms, scraping mechanisms on said beater arms and means below the beater for conveying and rotating carcasses past the scrapers.

62. In a device of the class described the combination with a shaft of beater arms adapted to be secured thereto, means for securing the beater arms angularly with the shaft, scraper blades rigidly secured on the beaters and means conveying and rotating a submerged carcass as acted upon by the beaters.

63. A machine of the class described embracing rotating means for supporting, rolling, and advancing a carcass, and beaters mounted at an angle to assist in the rotation and advancement of the carcass during the dehairing of the same.

64. In a carcass scraper of the class described a platform conveyer adapted to receive a carcass thereon, means adapted to move said conveyer in a linear direction, scraping mechanism mounted adjacent said conveyer adapted to scrape carcasses and rotate the same as they are conveyed thereon, and means for actuating said scraping mechanism simultaneously with the movement of said conveyer.

65. In a carcass scraping and cleaning machine the combination of a platform conveyer movable in a linear direction with means for moving the same, scraping mechanism mounted adjacent thereto adapted to simultaneously scrape carcasses and rotate the same as they are carried upon the conveyer and means for actuating said scraping mechanism.

66. In a carcass scraper of the class described the combination of a platform conveyer adapted to support a carcass with means for moving the same in a linear direction, flexible scraping mechanism mounted above said conveyer adapted to simultaneously rotate and scrape a carcass supported upon the conveyer as the conveyer is moved by said means and means for actuating said scraping mechanism as aforesaid.

67. In a machine of the class described the combination with means for supporting and turning a partly submerged carcass, of flexible beaters acting on the carcass while partly submerged.

In testimony whereof I have hereunto subscribed my name in the presence of two subscribing witnesses.

JOHN W. KOHLHEPP.

Witnesses:
C. W. HILLS,
K. E. HANNAH.